Patented Aug. 24, 1926.

1,597,443

UNITED STATES PATENT OFFICE.

THOMAS S. FOX, OF BROOKLYN, NEW YORK.

PRINTING.

No Drawing. Application filed August 22, 1919, Serial No. 319,262. Renewed June 7, 1922. Serial No. 566,578.

My invention relates to improvements in printing and has especially to do with the preparation for photomechanical reproduction of copy or original prints, drawings, etc., executed on surface such as cardboard, etc., which may be sized with water absorbent material or coated with materials such as gelatine, etc., or unsized such as water color artists' papers. The term water absorbent is used to differentiate such supports or surfaces from coatings or surfaces non-absorbent of water, such as collodion and various gums as copal mastic, etc.

A benzole rubber solution could not be applied over the present inks, without destroying the impressions; so at present rubber is only practical before the impression is made and then on outside edges where it can be peeled or rubbed away, always with a liability to smudge the impressions directly adjoining. It is not practical to use paper shields as stencils or friskets in small details. They are troublesome and expensive to cut, would be difficult to place and keep in small places with liability to smudge the inked impressions upon which they would have to be affixed.

The use of the water soluble gums, etc., necessitates dissolving away the same with water causing a water soaked condition of the paper, delay in drying, and liability to dissolve the face of sized papers, and cardboard, and also such soluble water colors, such as white, etc., that may have been used in the drawing.

In order to overcome these objections, I may employ water soluble printing inks for my films impressions and use substances soluble in benzole or alcohol for my stopping out medium. These water soluble inks may be made in any tones or colors, but in this case I use two, viz: white and black. My white ink may contain the same ingredients, in the same proportions as my black ink, except that I may substitute white coloring matter for black in the proportions of a 4 oz. of white instead of 1¼ oz. of the black. My white coloring matter may be of white lead, zinc oxide, etc., but I have found lithophone known as bronze seal sold by Gabriel & Schall, 21 Cliff Street, New York city, well suited to my purpose.

For my stopping out solutions, I may use such substances as beeswax, rosin, etc., and various gums soluble in benzole, but I have found a solution very suitable by dissolving in benzole, white topping powder, sold by William Zinsser, 195 William Street, New York city, which may be made thick or thin as occasion requires and leaves no appreciable stain.

In carrying out my invention I may proceed as follows: After applying water soluble ink by means of a rubber roller to a printing film preferably water-proof, (see my Patent 761,668), and after having prepared my subject by stopping out with a brush or otherwise, parts that are not to be treated, I proceed to make my impressions on the parts not stopped out, after which I dust over the same a suitable powder. For this purpose I have found powdered gum arabic well adapted because it combines with the ink, which contains some water, and upon slight moisture as from the breath, etc. leaves a firm crust on the surface of the ink, so that I may apply more stopping solution without danger of smudging my inked impressions. It is understood that all surplus powder is removed by brushing, etc. Subjects which I may treat may require dark and engraved black effects which I obtain by making my film impressions in white ink on any solid black places which may have been made with a black ink preferably such as Higgins water-proof, or may be the dark or black parts of a photograph.

In my co-pending patent application for reversing on metal, I have described the difficulties of using printing films whose printing elevations occupy the greater portion of the printing face of the film, so that it will be seen that by printing white dots, etc., on black grounds, I can readily relieve these dark places with engraved effects.

After having executed all my stopping out and film work, I wash off all my stopping out medium with benzole and the like, which carries with it any water soluble ink on its surface and does not stain the paper surface, dries very quickly and has no effect on my black or white ink, so that if I desire, I may apply more film impressions without delay from water-soaked conditions of the paper, or my subject may now be photographed for reproduction.

In the application of white printing ink to black grounds for photo mechanical reproduction, it is necessary to have sufficient covering power intensity or opacity in the ink to obliterate the effect of black at the points upon which the white impressions are made. I have found that white printing inks ground in oil or varnish appear too transparent when applied with a film on black grounds so that many impressions would be required to get sufficient intensity. The present white printing inks available, ground in oil or varnish are unsuited for use in this process. I am aware of English patents containing descriptions of printing inks containing water soluble gums, etc. but none mention water soluble white printing ink. All have certain gums and none add gum in powdered form after printing.

There are various modifications I may employ, viz: I may reverse my impressions by making small dots, etc., with film impressions in greasy ink on gelatin-coated paper and then stain the uncovered gelatin between the dots with my water ink, thinned, or I may use a water soluble dye or other water soluble inks not soluble in benzole for staining, and then wash away the greasy ink with benzole, which will leave the gelatin white and unstained where the greasy ink formerly was, and black in the other parts. The gelatin in this case prevents the black greasy ink from penetrating and staining the paper. As another modification, I may make impressions with my white ink and then roll over or dob or smear or wash over the parts so treated with an oily or varnish black ink which will color the whole part black, so treated, and then with absorbent cotton saturated with water I may sop up the white ink which, being white, cannot stain the paper unfavorably for photography and the paper cannot become water-soaked to any appreciable extent because the oily or varnish ink protects the greater part from water, leaving only small dotted parts exposed.

Impressions in my white ink on dark backgrounds as in photos will give when reproduced by the half-tone process a pleasing effect and different texture to different parts resembling tool or engraving work.

I may not desire an outline in black in all parts of a drawing, but to have my film impressions come up to and stop abruptly at predetermined places, for instance, if I were working over a gelatin photoprint where certain parts required black outlines and certain other parts required only the film impressions to come up to and stop at certain places not to be indicated by black outline, I would draw my black outline in a black water-proof ink such as "Higgins" and the other outlines in a blue water-proof ink, and then, after bleaching out the photoprint, my black and blue outlines remaining, the blue would indicate where to stop out for my film impressions, without black outlines and as blue photographs as white it serves only as a guide in the stopping out process, so I may make my film impressions up to guide lines that will not show in the photo-reproduction.

Another modification of my invention would be the preparation of the copy or original on paper by films for reproduction in colors, say in three or four colors, all the colors to be at angles similar to the three or four color process. In this case I may use an ordinary half-tone negative made with a sufficiently coarse mesh, say 65 to the inch, to permit of good photographic reduction at 45°. From this negative I would make a photoprint, say on velox or similar photo-papers, which would give me a picture in dots 65 to the inch at 45°. I would then make three photoprints from the same negative, which may be blue prints, sufficiently discernible to permit as a guide for my outlines, but also sufficiently faint to photograph as white. These three blue prints may be flowed with a gelatin coating or not, as desired, and then I would proceed to model with films at angles of 75 for the yellow, 105 for the red, and 15 for the blue, the black being at 45°, and then I would reduce all prints by photography and print the same upon metal for etching in the usual way. I do not limit myself to the use of water soluble inks on paper supports but I may use linseed oil varnish inks which are not soluble in alcohol, or any other ink not soluble in alcohol, and then in conjunction with such inks I may use as stopping out mediums solutions soluble in alcohol such as gum copal, French varnish, white shellac, etc., or any gums soluble in alcohol, particularly such as would leave no appreciable stain on the paper support. It has been the practice at times to apply by dusting or with a tuft of cotton to freshly printed impressions, magnesia talcum, chalk, etc. to prevent smudging. This has been done as an expedient where sufficient time could not be allowed for drying by oxidation from the air. These substances simply adhere as a very fine deposit to the surface of the ink which is liable to be smudged in handling even with this precaution and this particularly applies where such inks are applied to gelatine surfaces as they cannot sink into the paper and attach themselves, but simply lie on the surface. To obviate these objections the application of powdered gum arabic, and then the application of moisture greatly assists in fixing even these inks. In the use of white ink I may desire to strengthen or reinforce the impressions. This I accomplish by dusting on such substances as white lead, etc., but I prefer a mixture of gum arabic and lithophone. If my impressions are on smooth surfaces I may use a mixture in powdered form of about one part gum and one part lithophone by bulk. If on rough surfaces as water color illustration board I may use about 6 to 8 parts gum and one part lithophone by bulk. For my black ink, I use only powdered gum.

Of course it will be understood that various modifications may be made in the several ingredients their proportions and the order of procedure without departing from the spirit of the invention as claimed.

I claim:—

1. The method of printing consisting in producing upon a gelatinized body, the subject to be printed, marking thereon the parts to be treated, applying a printing film thereto with an ink having one solvent and applying to the other parts an ink having another solvent, thereafter removing the first ink and photographically reproducing the result upon the printing surface, and treating the same for printing therefrom.

2. The method of printing consisting in producing upon a gelatinized body, the subject to be printed, blocking out any parts of the subject not to be treated, applying marks around the same, staining between said marks and removing the first applied blocking out material and said marks.

3. The method of printing consisting in producing upon a gelatinized body, the subject to be printed, blocking out any parts of the subject not to be treated, applying marks around the same, staining between said marks, and removing the first applied blocking out material and said marks, and thereafter applying other marks.

4. The process of preparing a gelatinous surface for photo-mechanical reproduction by making white water soluble impressions thereon with a printing film, fixing the same, applying a greasy or oily ink over said impressions and the interstices between the same, and then removing the water soluble ink.

5. The method of printing consisting in producing upon a gelatinized body, the subject to be printed, blocking out any parts of the subject not to be treated, applying marks around the same, staining between said marks, and removing all but the stain.

6. The method of printing consisting in producing upon a gelatinized body, the subject to be printed, applying a printing film thereto with ink having one solvent and applying to the other parts an ink having another solvent, thereafter removing the first ink, and photographically reproducing the result upon a printing surface, and treating the same for printing therefrom.

In testimony whereof I hereunto affix my signature.

THOMAS S. FOX.